(12) United States Patent
Antipov et al.

(10) Patent No.: US 7,803,348 B1
(45) Date of Patent: Sep. 28, 2010

(54) COMPLEX COBALT OXIDE CATALYSTS FOR OXYGEN REDUCTION ELECTRODES IN ALKALINE FUEL CELLS

(75) Inventors: Evgeny V. Antipov, Moscow (RU);
Galina A. Tsirlina, Moscow (RU);
Sergey Y. Istomin, Moscow (RU); Oleg A. Drozhzhin, Moscow Region (RU);
Eduard E. Levin, Moscow Region (RU)

(73) Assignee: Horizon Fuel Cells, LLC, McLean, VA (US)

( * ) Notice: Subject to any disclaimer, the term of this patent is extended or adjusted under 35 U.S.C. 154(b) by 850 days.

(21) Appl. No.: 11/350,938

(22) Filed: Feb. 10, 2006

(51) Int. Cl.
*C01G 51/04* (2006.01)
*C01F 11/04* (2006.01)
*B01J 23/78* (2006.01)
*H01M 4/86* (2006.01)

(52) U.S. Cl. .......... 423/594.6; 423/263; 423/593.1; 423/594.1; 423/594.2; 423/594.3; 423/594.4; 423/594.5; 423/595; 423/596; 423/599; 423/594.16; 502/302; 502/325; 502/328; 429/40

(58) Field of Classification Search ............... 423/594.5, 423/594.6, 594.16, 263, 593.1, 594.1, 594.2, 423/594.3, 593.4, 595, 596, 599, 314, 325, 423/328, 344; 502/302, 305, 314, 344, 306; 429/40
See application file for complete search history.

(56) References Cited

U.S. PATENT DOCUMENTS 5,306,411 A * 4/1994 Mazanec et al. ............ 204/265

* cited by examiner

*Primary Examiner*—Stanley Silverman
*Assistant Examiner*—James Fiorito
(74) *Attorney, Agent, or Firm*—Hogan Lovells US LLP (57) ABSTRACT

Oxygen is reduced in the presence of a catalyst at the cathode of an alkaline-electrolyte fuel cell. Catalysts of the formula $Sr_{3-x}A_{1+x}Co_{4-y}B_yO_{10.5-z}$ wherein $-0.6 \leq x \leq 1.0$; $0 \leq y \leq 3$; and $-1.5 \leq z \leq 0.5$; wherein A represents Eu, Gd, Tb, Dy, Ho, or Y; and wherein B represents Fe, Ga, Cu, Ni, Mn, and Cr, demonstrate high catalytic activity and high chemical stability when used as the oxygen-reduction catalyst in alkaline fuel cells.

22 Claims, 7 Drawing Sheets

COMPLEX COBALT OXIDE CATALYSTS FOR OXYGEN REDUCTION ELECTRODES IN ALKALINE FUEL CELLS

FIELD OF THE INVENTION

This invention relates generally to catalysts used in fuel cells. More specifically, the present invention pertains to the use of complex cobalt oxides as catalysts for the oxygen reduction electrode in an alkaline fuel cell.

BACKGROUND OF THE INVENTION

Due to the increasingly high prices of hydrocarbon raw materials coupled with their gradual exhaustion, a worldwide intensive search is underway for alternative sources of energy. One of the most efficient and ecological ways to generate power is to use the energy of the chemical reaction $H_2 + \frac{1}{2}O_2 = H_2O$. In order to convert the energy of this chemical reaction directly into electrical energy a special arrangement called a fuel cell is required.

Depending upon the electrolyte used, several different types of fuel cells exist. The different fuel cells include fuel cells with solid electrolyte (SOFC), fuel cells with polymer electrolyte (PEFC), fuels cells with acid electrolyte (for example, phosphoric acid fuel cells (PAFC)), molten carbonate fuel cells (MCFC), and alkaline electrolyte fuel cells (AFC).

AFC's were one of the first types of fuel cells to be applied to a practical use. For example, the spacecraft industry uses AFC's. The principle of operation of an AFC is well known, and illustrated in FIG. 1.

Electrodes for AFC's are sophisticated technical devices and are made of several components. For example, the cathode for an AFC typically comprises at least a diffusion layer of polytetrafluoroethylene (PTFE) and high surface-area carbons and an active catalytic layer. Platinum group metals (e.g., Pt or Pd) are widely used as catalysts for the reduction of oxygen in an AFC. Primary disadvantages to these types of catalysts include their steep price and sensitivity to chemical pollutants.

In response to these disadvantages, different oxides have been proposed as catalysts for oxygen reduction electrodes. They include, for example, $MnO_2$ and oxides with spinel-type structures such as $Co_xFe_{3-x}O_n$ or $Co_xNi_{3-x}O_n$. Another group of catalysts include perovskite-type materials. In the crystal structure of the perovskite $ABO_3$, the A- cation and $O^{2-}$ anions form a cubic close packing structure. Smaller B- cations, like transition-metal cations (e.g., Fe, Co, Ni) occupy octahedral holes in the close packing structure.

Depending upon the concentration of oxygen vacancies in $ABO_{3-y}$, the ordering of vacancies may take place leading to the formation of the ordered perovskites. For example, a majority of the $ABO_{2.5}$ oxides crystallize in brownmillerite-type structures where layers of corner-shared octahedra are separated by oxygen-deficient layers containing chains of tetrahedra.

Transition-metal compounds with perovskite structures have high electronic conductivity and can be used as catalysts for the oxygen reduction electrodes in AFC's. Given these properties, complex oxides with perovskite structures have been studied as potential catalysts. For example, nickel- and cobalt-based perovskites of the following formula have been studied:

$$Ln_{1-x}A_xCo_{1-y}Ni_yO_{3-\delta} \qquad (1)$$

wherein $0 \leq x \leq 0.6$; $0.01 \leq y \leq 0.1$; $0 \leq \delta \leq x/2$, and wherein Ln represents an element of the group consisting of La, Pr, Nd, Sm, Gd, and Y, and wherein A represents an element of the group consisting of Ca, Ba, and Sr. The perovskites of Formula 1 demonstrate high catalytic activity.

Also, perovskites of the following formula:

$$ABO_{3-\delta} \qquad (2)$$

wherein $-0.2 \leq \delta \leq -0.05$ and $+0.05 \leq \delta \leq +0.7$, and wherein A represents an element of the group consisting of Na, K, Rb, Ca, Ba, La, Pr, Sr, Ce, Nb, Pb, Nd, Sm, and Gd; and wherein B represents at least one metal from the group consisting of Cu, Mg, Ti, V, Cr, Mn, Fe, Co, Nb, Mo, W, and Zr, were shown to have high catalytic activity in the process of oxygen reduction.

Compounds with a brownmillerite structure:

$$ABO_{2.5-y} \qquad (3)$$

wherein $-0.2 \leq y \leq -0.05$ and $+0.05 \leq y \leq +0.3$, were also found to be good catalysts.

Perovskites of the following formula:

$$(A_xB_{1-x})(C)O_{3+(-)y} \qquad (4)$$

wherein A represents an element of the group consisting of Ca, Sr, and Ba; and wherein B is any one element of atomic numbers 57-71; and wherein C represents any one element of atomic numbers 40-47 and 72-79, were also studied as cathode catalysts for AFC's.

Also studied were the following perovskites:

$$A_xB_yO_3 \qquad (5)$$

wherein $0.1 \leq x \leq 0.9$; $0.1 \leq y \leq 0.9$, and wherein A represents an element consisting of the group of Ba, Sr, Ca, Y and Sc and/or an element consisting of the group of La, Ce, Sm, Pr and Nd, and wherein B represents one or several transition metals of the group consisting of Co, Mn, Fe, Ni, Cu, Cr, Pd, Pt, Ru, Rh, and Ir.

Finally, high catalytic activity also was reported for perovskites $$A_{1-y}B_yQO_3 \qquad (6)$$

wherein (A=La, B=Sr, Q=Co, y=0.3); (A=Ce or Sc; B=Sr or Mg; Q=Ni, Co, or Mn; $0.2 \leq y \leq 0.4$); or (A=La, Ce, Nd, Pr, or Sc; B=Sr, Ca, Ba, or Mg; Q=Ni, Co, Fe, or Mn; $0.0001 \leq y \leq 1$).

One of the most important traits for the materials used as catalysts for oxygen reduction in AFC's is high chemical stability. Compounds with perovskite-like structure have high catalytic activity but poor stability in alkaline solutions. For example, the activity of $LaNiO_3$ was found to decrease rapidly in alkaline solutions.

Therefore a need exists for a catalyst for oxygen reduction in AFC's that demonstrates high catalytic activity and high chemical stability.

SUMMARY OF THE INVENTION

The present invention uses new cobalt-based oxides of the following formula:

$$Sr_{3-x}A_{1+x}Co_{4-y}B_yO_{10.5-z} \qquad (1\text{-}1)$$

wherein $-0.6 \leq x \leq 1.0$; $0 \leq y \leq 3$; $-1.5 \leq z \leq 0.5$ and wherein A represents an element of the group consisting of Eu, Gd, Tb, Dy, Ho, and Y and wherein B represents an element of the group consisting of Fe, Ga, Cu, Ni, Mn, and Cr, as a catalyst for oxygen reduction in AFC's.

BRIEF DESCRIPTION OF THE DRAWINGS

The accompanying drawings, which are included to provide further understanding of the invention and are incorporated in and constitute part of this specification, illustrate embodiments of the invention and together with the description serve to explain the principles of the invention. In the drawings.

DETAILED DESCRIPTION OF THE PREFERRED EMBODIMENTS

As noted above, the present invention comprises a catalyst for oxygen reduction in fuel cells comprising cobalt-based oxides of the following formula:

$$Sr_{3-x}A_{1+x}Co_{4-y}B_yO_{10.5-z} \qquad (1\text{-}1)$$

wherein $-0.6 \leq x \leq 1.0$; $0 \leq y \leq 3$; $-1.5 \leq z \leq 0.5$ and wherein A represents an element of the group consisting of Eu, Gd, Tb, Dy, Ho, and Y and wherein B represents an element of the group consisting of Fe, Ga, Cu, Ni, Mn, and Cr.

Furthermore, the present invention comprises an alkaline fuel cell comprising a catalyst for oxygen reduction comprising Formula 1-1 wherein $-0.6 \leq x \leq 1.0$; $0 \leq y \leq 3$; $-1.5 \leq z \leq 0.5$ and wherein A represents an element of the group consisting of Eu, Gd, Tb, Dy, Ho, and Y and wherein B represents an element of the group consisting of Fe, Ga, Cu, Ni, Mn, and Cr.

Figure 1:
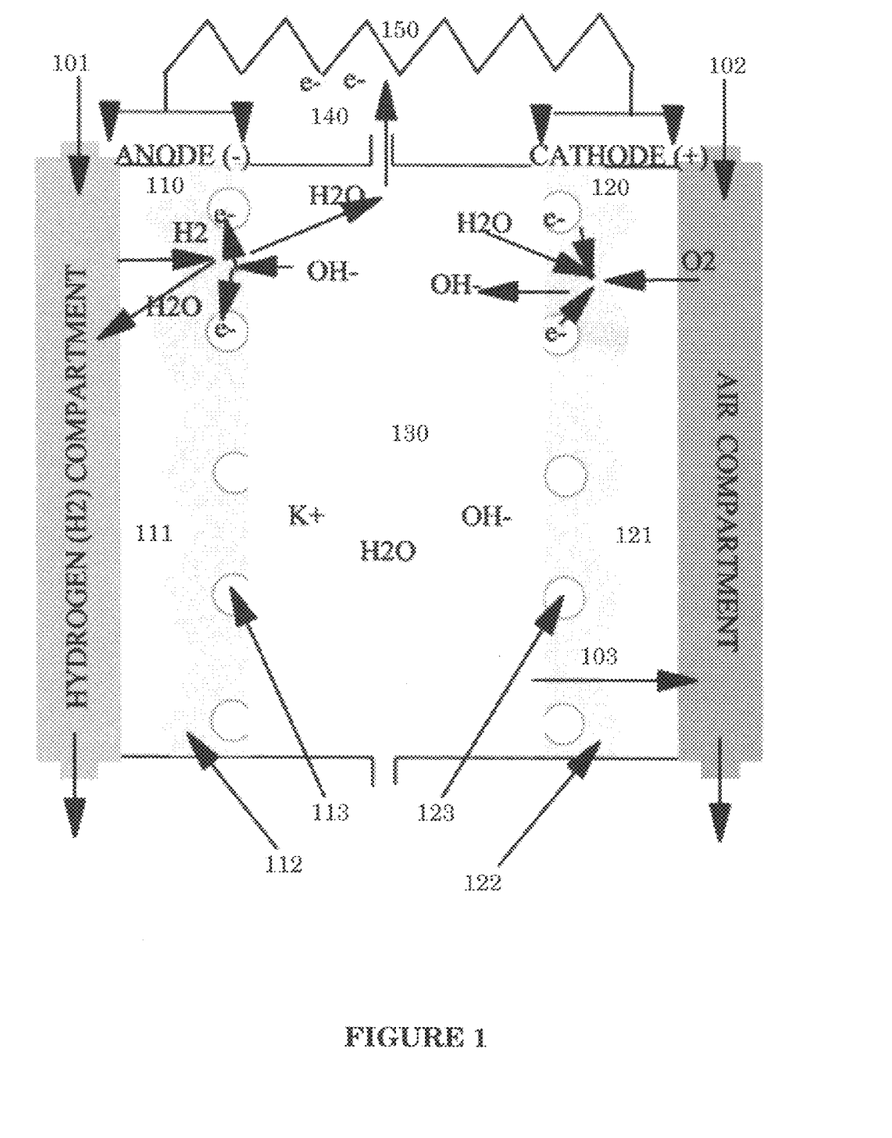
FIG. 1 is a cross-sectional view of a typical AFC.

FIG. 1 illustrates the typical configuration and operation of an AFC 100. The AFC 100 is fed hydrogen 101 and oxygen (or air) 102 and produces water 103, heat, and electricity. Each electrode 110, 120 may include a white PTFE layer 111, 121, a catalytic black layer 112, 122, and a nickel mesh 113, 123. The electrodes 110, 120 are separated by a porous matrix 130 saturated with, in the case of an AFC 100, an aqueous alkaline solution, often KOH. At the anode 110, hydrogen 101 is oxidized by the following reaction:

The electrons 140 produced by the oxidation reaction flow through the circuit 150 and return to the cathode 120. At the cathode 120, oxygen 102 is reduced in the presence of a catalyst by the following reaction:

The net reaction, $H_2 + \frac{1}{2}O_2 \rightarrow H_2O$, produces heat and electricity.

Figure 2:
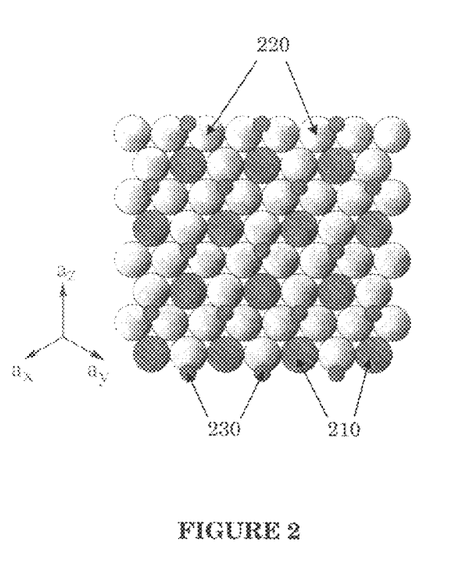
FIG. 2 is an illustration of the perovskite structure of a close-packed $ABX_3$ layer.
Figure 3:
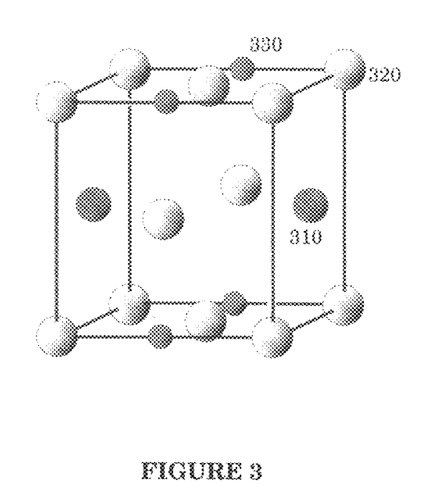
FIG. 3 is an illustration of a unit cell of the perovskite $ABX_3$.

FIG. 2 illustrates the crystalline structure of a close-packed perovskite $ABX_3$ layer. The $A^+$ cations 210 and $X^{2-}$ anions 220 form a cubic close packing structure. The smaller $B^+$ cations 230, like transition metal cations (e.g., Fe, Co, or Ni), occupy the octahedral holes in the close packing structure. Similarly, FIG. 3 illustrates a unit cell of the perovskite and the placement of the $A^+$ cations 310, smaller $B^+$ cations 330, and $O^{2-}$ anions 320.

Figure 4:
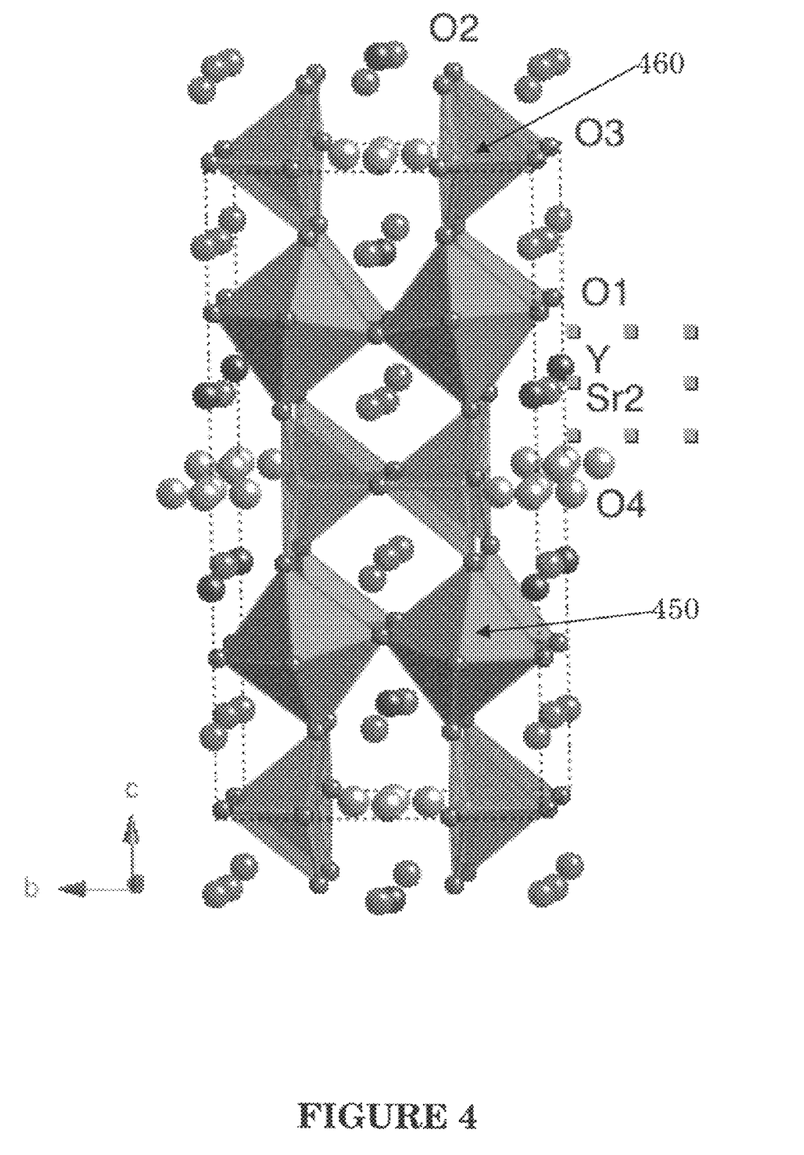
FIG. 4 is an illustration of the crystal structure of $Sr_3YCo_4O_{10.5}$.
Figure 5:
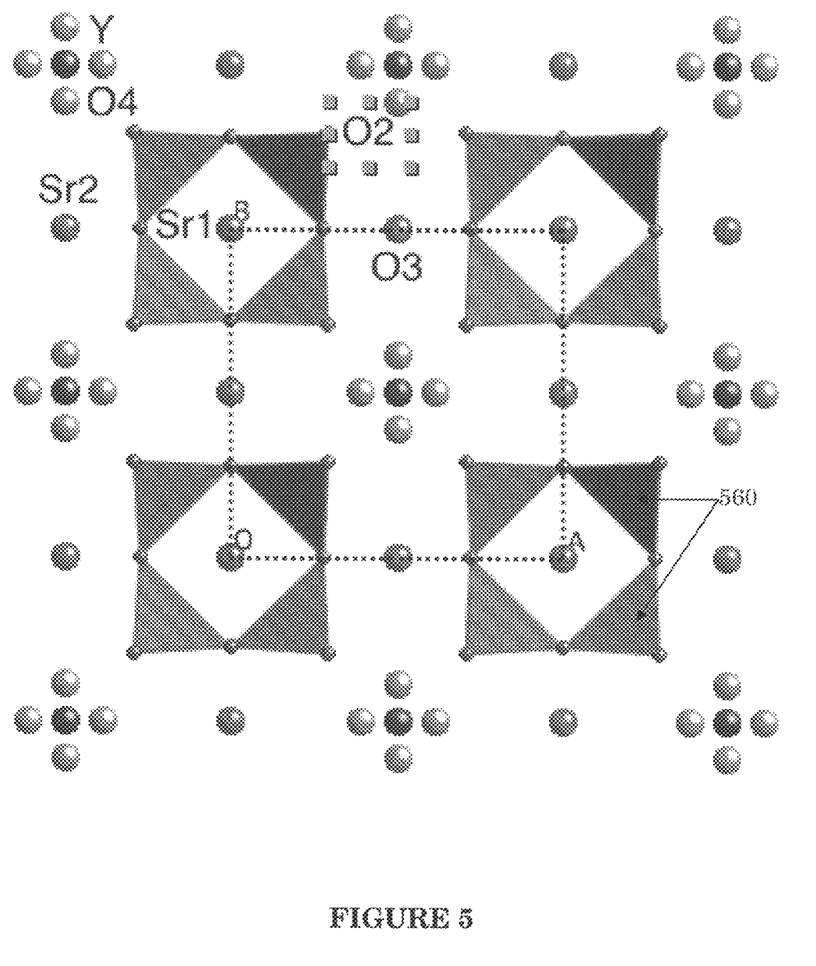
FIG. 5 is an illustration of the structure of the oxygen-deficient layer in $Sr_3YCo_4O_{10.5}$.

The cobalt-based oxides of Formula 1-1 have unique structures, as exemplified in FIG. 4, with a new type of ordering of the oxygen vacancies, as exemplified in FIG. 5. The crystal structure of the cobalt-based oxides include layers of corner-shared octahedral 450 separated by oxygen-deficient layers. In the oxygen-deficient layers 500 there are tetra cyclic units of corner-shared tetrahedra $CoO_4$ 460, 560 with an additional oxygen atom. The concentration of the oxygen vacancies in the layer can be varied depending on the preparation process and heat treatment conditions.

The catalytic material of Formula 1-1 was prepared by two different methods. In the first, stoichiometric amounts of strontium carbonate, yttrium, and gadolinium oxides and $Co_3O_4$ were mixed in agate mortar. Powders were pressed into pellets and annealed at 1100-1150 degrees Celsius for the time necessary to obtain single-phase samples. In the second method, a water solution of cobalt, strontium, and rare-earth nitrates was prepared and its aerosol was produced by ultrasonic frequency spraying. Then, this aerosol was passed through a tube furnace heated at 600-1100 degrees Celsius. This results in a fine powder of desired oxides. Phase composition of the samples was determined by X-ray powder diffraction. Crystal data for $Sr_3YCo_4O_{10.5}$, $Sr_{3.6}Y_{0.4}Co_4O_{10.5-z}$, and $Sr_2Gd_2Co_4O_{10.5-z}$ are shown in Table 1.

TABLE 1

| | (Crystal Data) | | |
|---|---|---|---|
| Space group | $Sr_3YCo_4O_{10.5}$ I4/mmm | $Sr_2Gd_2Co_4O_{10.5-z}$ I4/mmm | $Sr_{3.6}Y_{0.4}Co_4O_{10.5-z}$ Pm3m |
| Unit cell: | | | |
| a/Å | 7.62389(1) | 7.5833(8) | 3.8464(5) |
| c/Å | 15.32701(5) | 15.304(2) | |
| Z | 4 | 4 | 0.25 |

To determine the electrocatalytic activity of the catalysts, model gas-diffusion electrodes were prepared. Carbon paper containing 30 wt% of PTFE was used as the support layer. An active layer consisting of the carbon black (0.004 g, Vulcan XC-72R, Cabot Corp., USA), the catalyst (0.004 g) and PTFE (0.0008 g) was prepared. Components were blended in a mass ratio of 5:5:1 in an ultrasonic bath under acetone with subsequent drying and were applied to the carbon paper. Electrodes then were heat-treated in air at 320 degrees Celsius to remove additives.

Electrocatalytic activity of the gas-diffusion electrodes was determined by measuring the cathodic polarization curves in 6M KOH aqueous solution at 25 degrees Celsius. Measurements were performed starting from the open circuit potential up to $-0.25$V at a sweep rate of 1mV/sec. The potential values are reported versus the Hg/HgO electrode.

Results are given in Table 2. The activities of the previously studied perovskite-based catalysts also are reported in Table 2 for comparison.

TABLE 2

(Current Densities)

| Catalyst | Temperature, °C. | Current density at E = −0.15 V (normalized per geometric area), mA/cm² | Current density at E = −0.25 V (normalized per geometric area), mA/cm² | Loading (mg/cm²) |
|---|---|---|---|---|
| $Sr_3YCo_4O_{10.5}$ | 25 | 11 | 50 | 11 |
| $Sr_{3.6}Y_{0.4}Co_4O_{10.5-z}$ | 25 | 28 | 105 | 11 |
| $Sr_2Gd_2Co_4O_{10.5-z}$ | 25 | 19 | 80 | 11 |
| $Nd_{0.8}Sr_{0.2}Co_{0.9}Ni_{0.1}O_3$* | 25 | 150 | — | 75 |
| $LaNiO_3$ | 25 | 20 | 100 | 160 |
| $La_{0.6}Ca_{0.4}CoO_{3-x}$ | 25 | from 2.3 to 15 | from 8.6 to 32 | 10** |

*determined in fuel cell configuration
**loading was estimated from the thickness of the active layer In order to compare the obtained current densities for various electrodes, the loadings should be considered. Higher loadings can correspond to the thicker active layers, thus affecting availability of pores. Therefore, low loadings were chosen for these tests.

Catalytic activity of the $Sr_3YCo_4O_{10.5}$ was found to be comparable or higher than that of perovskite materials. However, only rough comparisons of the current densities can be done due to impracticalities of comparison of such factors as porosity and thickness of the electrodes.

Figure 6:
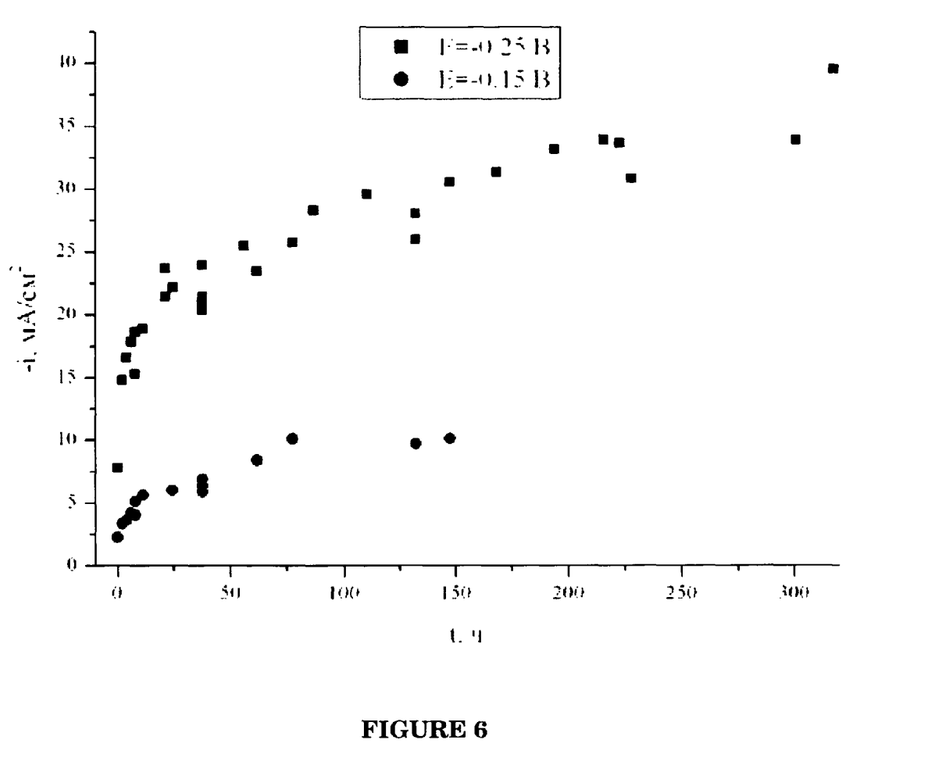
FIG. 6 is a graph illustrating the relation between the time dependencies and the current density for $Sr_3YCo_4O_{10.5}$ corresponding to various overpotentials.

FIG. 6 illustrates the current densities versus the time dependencies at E=−0.15 and E=−0.25 V of $Sr_3YCo_4O_{10.5}$. This shows an estimation of the stability of the catalytic activity of the catalysts of Formula 1-1.

Figure 7:
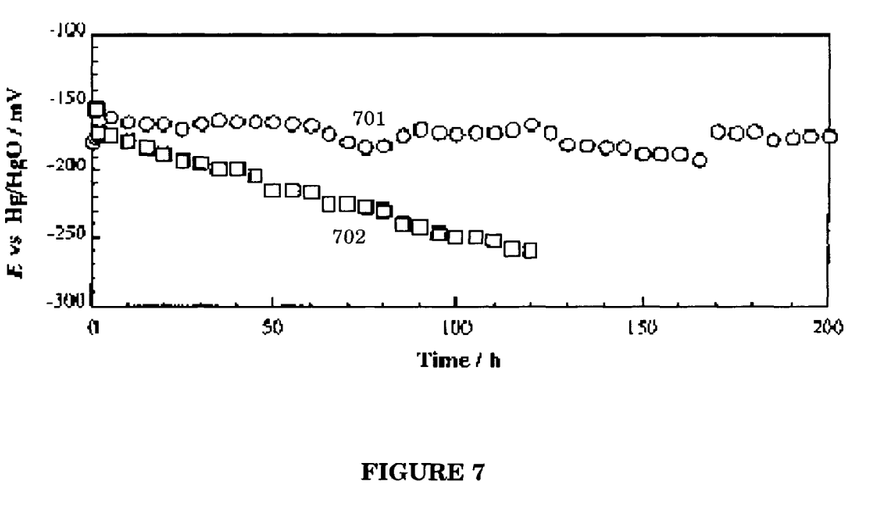
FIG. 7 is a graph illustrating the relation between time and potential dependencies for $Pr_{0.06}Ca_{0.4}CoO_3$ and $La_{0.6}Ca_{0.4}CoO_3$ under galvanostatical conditions in 8M KOH solution at 60 degrees Celsius.
Figure 8:
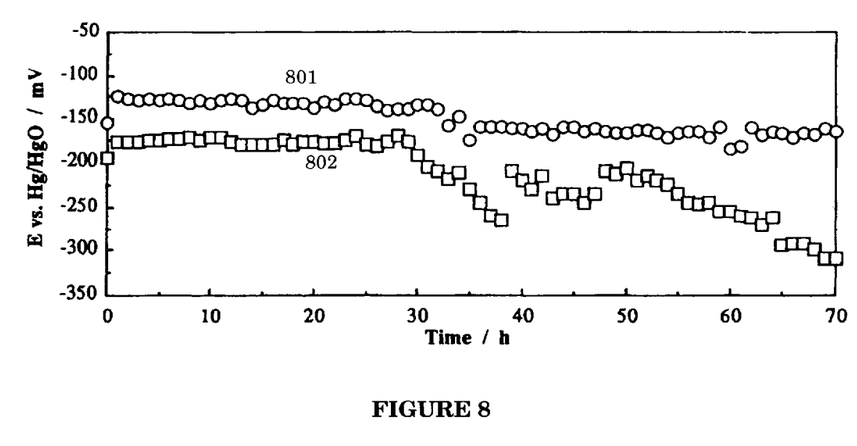
FIG. 8 is a graph illustrating the relation between time and potential dependencies for $La_{0.6}Sr_{0.4}Fe_{0.6}Mn_{0.4}O_3$ and carbon black under galvanostatical conditions in 9M NaOH solution at 80 degrees Celsius.

No decrease of catalytic activity was detected for $Sr_3YCo_4O_{10.5}$. At the same time, FIGS. 7 and 8 show that analogs exhibit an obvious decrease of catalytic activity with time, shown by the shift towards more negative values. FIG. 7 illustrates $Pr_{0.6}Ca_{0.4}CoO_3$ (701) and $La_{0.6}Ca_{0.4}CoO_3$ (702) under galvanostatical conditions (current density of 300 mA/cm² corresponds to E=−0.15) in 8M KOH solution at 60 degrees Celsius. FIG. 8 illustrates $La_{0.6}Sr_{0.4}Fe_{0.6}Mn_{0.4}O_3$ (801) and carbon black (802) under galvanostatical conditions (current density of 500 mA/cm² corresponds to E=−0.12) in 9M NaOH solution at 80 degrees Celsius.

We claim:

1. An oxygen reduction catalyst comprising a compound represented by Formula 1-1:

$$Sr_{3-x}A_{1+x}Co_{4-y}B_yO_{10.5-z} \quad (1\text{-}1)$$

wherein $-0.6 \leq x \leq 1.0$; $0 \leq y \leq 3$; and $-1.5 \leq z \leq 0.5$;
wherein A represents an element of the group consisting of Eu, Gd, Tb, Dy, Ho, and Y;
wherein B represents an element of the group consisting of Fe, Ga, Cu, Ni, Mn, and Cr; and
wherein said compound further comprises a crystal structure comprising a plurality of layers of corner-shared octahedra, wherein each of said layers is separated by an oxygen-deficient layer, wherein said oxygen-deficient layers comprise tetra cyclic units of corner-shared tetrahedra $CoO_4$ with an additional oxygen atom.

2. The oxygen reduction catalyst of claim 1, wherein an amount of oxygen vacancies in said oxygen-deficient layers vary depending on the preparation process and heat-treatment conditions.

3. The oxygen reduction catalyst of claim 1, wherein said compound is represented by the formula $Sr_3YCo_4O_{10.5}$.

4. The oxygen reduction catalyst of claim 1, wherein said compound is represented by the formula $Sr_{3.6}Y_{0.4}Co_4O_{10.5-z}$.

5. The oxygen reduction catalyst of claim 1, wherein said compound is represented by the formula $Sr_2Gd_2Co_4O_{10.5-z}$.

6. The oxygen reduction catalyst of claim 1, wherein A represents Eu.

7. The oxygen reduction catalyst of claim 1, wherein A represents Gd.

8. The oxygen reduction catalyst of claim 1, wherein A represents Tb.

9. The oxygen reduction catalyst of claim 1, wherein A represents Dy.

10. The oxygen reduction catalyst of claim 1, wherein A represents Ho.

11. The oxygen reduction catalyst of claim 1, wherein A represents Y.

12. The oxygen reduction catalyst of claim 1, wherein B represents Ga.

13. The oxygen reduction catalyst of claim 1, wherein B represents Fe.

14. The oxygen reduction catalyst of claim 1, wherein B represents Cu.

15. The oxygen reduction catalyst of claim 1, wherein B represents Ni.

16. The oxygen reduction catalyst of claim 1, wherein B represents Mn.

17. The oxygen reduction catalyst of claim 1, wherein B represents Cr.

18. A fuel cell comprising an oxygen reduction catalyst comprising a compound represented by Formula 1-1:

$$Sr_{3-x}A_{1+x}Co_{4-y}B_yO_{10.5-z} \quad (1\text{-}1)$$

wherein $-0.6 \leq x \leq 1.0$; $0 \leq y \leq 3$; and $-1.5 \leq z \leq 0.5$;
wherein A represents an element of the group consisting of Eu, Gd, Tb, Dy, Ho, and Y;
wherein B represents an element of the group consisting of Fe, Ga, Cu, Ni, Mn, and Cr; and
wherein said compound further comprises a crystal structure comprising a plurality of layers of corner-shared octahedra, wherein each of said layers is separated by an oxygen-deficient layer, wherein said oxygen-deficient layers comprise tetra cyclic units of corner-shared tetrahedra $CoO_4$ with an additional oxygen atom.

19. The fuel cell of claim 18, wherein said fuel cell is an alkaline fuel cell.

20. The fuel cell of claim 18, wherein said compound is represented by the formula $Sr_3YCo_4O_{10.5}$.

21. The fuel cell of claim 18, wherein said compound is represented by the formula $Sr_{3.6}Y_{0.4}Co_4O_{10.5-z}$.

22. The fuel cell of claim 18, wherein said compound is represented by the formula $Sr_2Gd_2Co_4O_{10.5-z}$.

* * * * *